United States Patent [19]

Betker et al.

[11] Patent Number: 5,222,178
[45] Date of Patent: Jun. 22, 1993

[54] HIGH DENSITY FIBER OPTIC CABLE PACKAGING

[75] Inventors: Jay B. Betker; Richard W. Gehle, both of Yorba Linda, Calif.

[73] Assignee: Hughes Aircraft Company, Los Angeles, Calif.

[21] Appl. No.: 916,296

[22] Filed: Jul. 17, 1992

[51] Int. Cl.$^5$ .................................. G02B 6/44
[52] U.S. Cl. ..................... 385/110; 385/113; 385/114
[58] Field of Search ............... 385/110, 111, 112, 113, 385/114

[56] References Cited

U.S. PATENT DOCUMENTS

| | | | |
|---|---|---|---|
| 4,205,899 | 6/1980 | King et al. | 385/113 X |
| 4,401,366 | 8/1983 | Hope | 385/113 X |
| 4,690,498 | 9/1987 | Priaroggia | 385/113 |
| 4,964,691 | 10/1990 | Nelson et al. | 385/110 |

Primary Examiner—Brian Healy
Assistant Examiner—Phan T. Heartney
Attorney, Agent, or Firm—Wanda K. Denson-Low

[57] ABSTRACT

A high density fiber optic cable including a cylindrical core member having a number of helical grooves extending along its length. Up to a hundred or more optical fibers are placed into each helical groove. The core member and fibers are covered by an outer member which retains the fibers and acts as an environmental seal. A strength member can be placed within an internal void in the core or the outer member can act as the strength member. Where the outer member is the strength member, additional cables may be placed within the internal void.

3 Claims, 1 Drawing Sheet

HIGH DENSITY FIBER OPTIC CABLE PACKAGING

TECHNICAL FIELD

The present invention relates to fiber optic cables. More specifically, the present invention pertains to a cable useful for high density packaging of optical fibers. The cable of the present invention is particularly, although not exclusively useful because of the cable's ability to handle hundreds of optical fibers while minimizing outside diameter, and maintaining flexibility to allow tighter spooling of the cable.

BACKGROUND OF THE INVENTION

Communications systems have evolved rapidly over the last several years to the point where today's communications systems include both audio/visual and data communications. In these systems, signals are sent from one location to another in a variety of ways, such as via transmission lines, airwaves or integrated systems incorporating both. The major benefit of using airwaves is their inherent ability to transfer signals over great distances without the necessity of physical placement of transmission lines. Unfortunately, airwave transmissions are subject to a variety of electro-magnetic interferences. Moreover, these transmissions are less secure in that they can be intercepted by anyone having an appropriate receiver. Still further, where shorter distances are involved, the necessary transceiver systems are often too bulky. It is in these situations that physical cabling is the preferred method of transmission.

The cables for audio/visual and data communications have improved greatly over the years. Early cables were simple, single metallic conductors. Next came multiple metallic conductor cables. More recently, advancing technology has allowed multi-signal transmissions over a single metallic conductor. The resulting cables were able to handle more and more signals, but unfortunately were becoming increasingly bulky.

With the advent of the electronic age and the interest in miniaturization came the need to reduce the size of cabling while increasing cable transmission capacity. Soon a new industry, evolved to meet this need and this industry used optical fibers instead of metallic conductors. To those in the art, it was immediately apparent that fiber optic transmission lines were a great improvement over metallic conductor lines because each fiber could handle a variety of transmissions simultaneously while requiring only a fraction of the space of its metallic conductor equivalent. Because of their capacity-to-space ratios, optical fibers are used today as the cable of choice for thousands of applications. Optical fibers are increasingly the media of choice of EMI/EMP resistant, tamper resistant communications and netting lines. The fiber optic cables can be used above ground, underground and underwater.

Generally, today's fiber optical cables are made up of three parts. They are: 1) the optical fibers; 2) the strength member; and 3) the buffering media. The optical fibers are the actual signal carriers and the strength member is that part of the cable which is designed to bear the load of the other portions of the cable during storage, placement and use. The buffering media is the interface between the fibers and the strength member and is designed to ensure the integrity of the optical fibers during placement and later use.

As those skilled in the art will recognize, modern optical fibers may be multi-mode, single-mode or polarization preserving. Their outside diameters range from 80 microns to 250 microns depending on their type and manufacturer. Each individual fiber is made up of the transmission portion known as the lightwave guide and a protective portion or coating. The lightwave guide is typically less than 20 microns high or wide, and the remainder of the fiber is typically an acrylate protective coating.

As noted earlier, the minute size of the optic fibers facilitates high density cabling. The cabling or packaging of the fibers is critical because the fibers are structurally weak as a result of their material properties and size. The most critical aspect of the mechanical packaging of the fibers is the protection of the fibers from a harsh environment and from the introduction of compressive or tensile strain to the fibers during handling or while in service.

In the past, both these tasks were met by packaging the optical fibers into small diameter, thick-walled plastic tubes. Representative dimensions were a tube diameter of 0.125 inches and a tube wall thickness of 0.030 inches. Each of these tubes housed only 1 to 12 optical fibers. Neither the fibers nor the tubes were suitable load bearing members. Accordingly, these tubes, once filled, were typically wound along a core media or strength member in a helical manner for a multi-fiber, optomechanical cable. The resulting structure was one that was much like those produced in the multi-metallic conductor cable industry. The packaging densities of those designs were limited by the design, characteristics and availability of the plastic tubing. Each tube had to have a specific internal diameter such that, when combined with the winding helix angle, the optical fibers would not bind into the tube's walls during bending, twisting or stretching of the cable. Still further, the tube wall had to be thick enough to prevent buckling or crushing when subjected to cross length handling loads. These loads are present during handling, such as during winding resulting from level wind mechanisms. These loads are also present when the cable is compressed such as when the cable is stepped on or run over. As is clear from the foregoing, the limiting factor of the packaging density was the tube structure and dimensions. The tube structure and dimensions were limited by the load carrying capacity of the strength member. As those skilled in the art will recognize, above ground cable strength members must often be sized by ice accumulation weight. This is so because as the diameter increases, the cable will have a greater top surface area which will accumulate more ice. As the cable diameter increases to accommodate additional optic fiber bundles, the ice accumulation weight increases also. As the ice accumulation weight increases, the use of progressively larger strength members is necessary. This, again, reduces the fiber capacity.

Recent advancements in the protective coatings on individual fibers have resulted in fibers that are virtually self-sufficient in their ability to protect the fiber itself without the need for additional buffering media. Fiber optic cabling technology, on the other hand, has not kept pace with optic fiber technology. Current optical fiber cables are based on the outdated technology described above and presume that the fibers must be packaged in tubes prior to cabling.

In light of the above, it is an object of the present invention to increase the fiber density of an optomechanical transmission cable, while minimizing the outside diameter of the cable. Another object is to provide a structure that obviates the need for packaging the fibers in tubes prior to winding on a core or strength member. Still another object of the present invention is to provide a new fiber buffering system which will allow a significant increase in the packaging density of opto-mechanical cables. Another object is to provide a fiber optic cable providing for easier access to individual fibers allowing branches of cables to be easily and economically created. Yet another object of the present invention is to maximize protection of the optical fibers. Still another object of this invention is to provide a cable that is easy to manufacture and is comparatively cost effective.

SUMMARY OF THE INVENTION

A fiber optic cable is provided having a core member with several helical grooves extending along its length. Each of the helical grooves holds from one to a hundred of the optical fibers which are the transmission media of the cable. The core member and fibers are covered by an outer member. Normally, this outer member acts as a protective seal and as a strength member. The forgoing structure is such that it is possible for the core member to be hollow and one or more additional cables can be placed through the lumen of the core member. Alternatively, a strength member can be placed in the hollow space for application where it is not desirable that the outer member act as the strength member of the cable.

The novel features of this invention, as well as the invention itself, both as to its structure and its operation will be best understood from the accompanying drawings, taken in conjunction with the following description, in which similar reference characters refer to similar parts, and in which:

DESCRIPTION OF PREFERRED EMBODIMENTS

Figure 1:
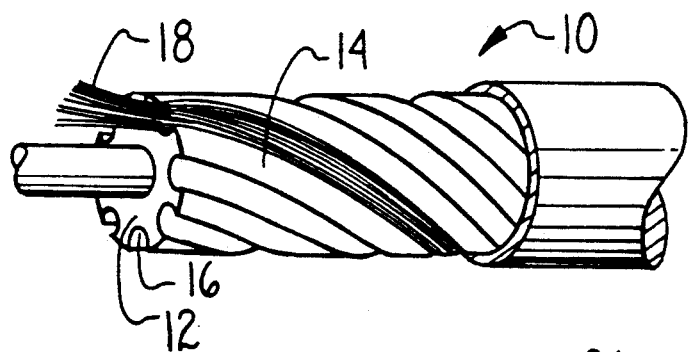
FIG. 1 is a perspective view of the high density fiber optic cable shown with partial cutaways of the various layers.

Referring initially to FIG. 1, the high density fiber optic cable of the present invention is shown and generally designated 10. Cable 10 has as its primary structural element a core member 12. Core member 12 is typically an extruded, molded or pultruded plastic such as Teflon, polyethylene or polyproplyene. It is to be recognized that any semi-rigid material could be substituted for the above materials as long as the material was of sufficient strength and durability. Core member 12 is an elongated, cylindrical member running the length of the cable 10. Moreover, core member 12 has an outer surface 14.

Extending along the length of core member 12 and cutting into outer surface 14 is at least one helical groove 16. Typically there are several helical grooves 16 on any specific core member 12. The helical grooves 16 can be formed in any of a number of methods. As those skilled in the art will recognize, the grooves 16 can be formed at the time the core member 12 is formed. For example, the core 12 could be extruded including the grooves 16. Alternatively, the core 12 could be extruded first then reworked to form the helical grooves 16. These methods, or any other method of producing the requisite core member 12 and grooves 16, could be used as long as the resulting structure is sufficiently strong and durable to prevent crushing or kinking of the cable.

Each groove 16 is designed to hold from one to a hundred or more optical fibers 18. The size, shape and number of helical grooves 16 is dependent on the number of optical fibers it is to hold. Generally, each groove 16 must be sufficiently deep to ensure that all of the optical fibers 18 are fully recessed within the groove and that none of the fibers 18 extend beyond the outer surface 14. Each groove must be such that the enclosed optical fibers 18 are not put into a state of axial compression or tension when the cable is being bent through large variations in the bend radii, loaded axially by environmental or deployment loads, and/or twisted during a torsional load. The groove size is further limited because the core member 12, as the primary structural element, must be able to prevent cushing or kinking of the cable. As can be appreciated, the core member 12 is the lateral load bearing member. These loads are borne by the core 12 along the outer surface 14. If the grooves 16 are too large, the remaining portions of the outer surface 14 may be insufficient to bear the lateral loads and could allow lateral compression of the fibers 18. Moreover, if too little outer surface 14 remains, the cable 10 could kink and cause axial compression or tension in the optic fibers 18. These situations, should they occur could result in a catastrophic failure of the cable 10.

The helical pitch of the grooves 16 and the dimensions of the grooves 16 must be determined based on the specific dimensions and quantities of the fibers 18 which will be packaged in the cable 10. The design of the grooves 16 is the key to the entire invention. Analysis must be performed knowing the worst case bend radii which the cable 10 may experience. The structural analysis which is non-linear in nature and requires extensive use of both empirical and theoretical information is well known by those skilled in the art.

The optical fibers 18 of the present invention may be multi-mode, single-mode or polarization preserving. Their outside diameters can range from approximately 80 microns to 250 microns or more without departing from the present invention. Each individual fiber 18 is typically made up of the transmission portion known as the lightwave guide and a protective portion or coating. The lightwave guide is generally less than 20 microns high or wide, and the remainder of the fiber is typically an acrylate protective coating. This coating must be of a type sufficient to protect the fiber without the necessity of a tube buffer media.

Typically the core member 12 and the optical fibers 18 are enclosed by an outer member 20. This outer member 20 ensures that the fibers 18 remain in the grooves 16. Still further, the outer member provides an environmental seal around the outside of cable 10. Generally, the outer member 20 is similar to those found in the metallic conductor cable industry. It is typically made of a semi-flexible material such as vinyl, Teflon, polyethylene, polyproplyene, other plastic or any other material able to provide a seal while retaining the fibers 18 in the grooves 16.

Figure 2:
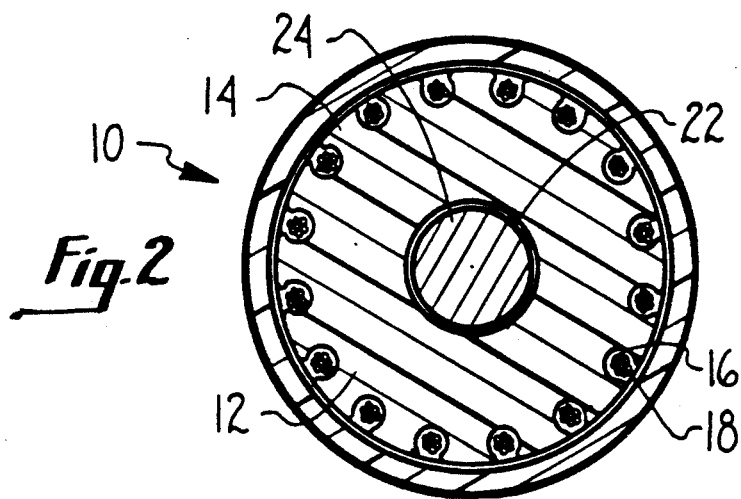
FIG. 2 is a cross-sectional view of the high density fiber optic cable including an internal strength member.

While the core member 12 can act as the strength member, the cable 10 described above normally requires the incorporation of an additional strength member. As is shown in FIG. 2, it is possible to position a strength member internally within the cable 10. For this type of strength member to be used, the core member 12 must include an internal void 22. Internal void 22 is most easily formed at the time the core 12 is being formed. A suitable strength member 24 is located within the internal void 22. The strength member 24 must have sufficient strength to prevent undesirable stretching, bending or kinking of the cable 10. Strength member 24 can be any metal, plastic, composite or other material that has sufficient strength while still allowing flexing of the cable during spooling and the like.

Figure 3:
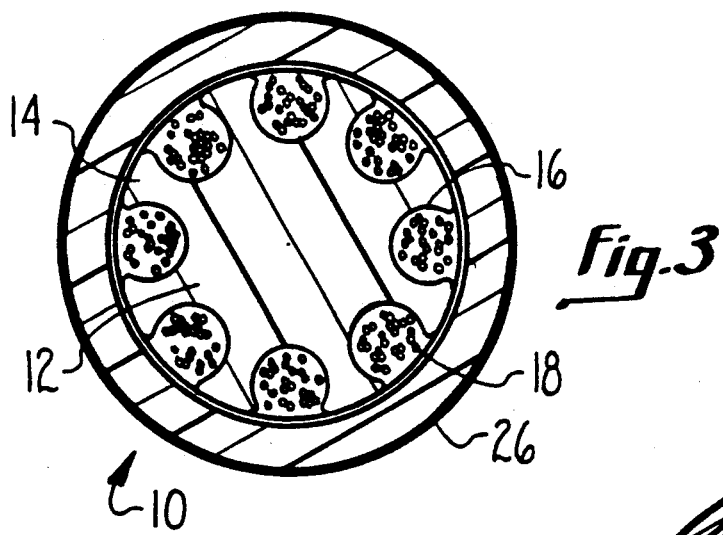
FIG. 3 is a cross-sectional view of the high density fiber optic cable including an external strength member.

An alternative, although equally desirable embodiment is shown in FIG. 3. In FIG. 3, an internal strength member is not used. Instead, the outer member 26 doubles as an external strength member. If outer member 26 is also the strength member, then the outer member 26 must have sufficient strength to prevent undesirable stretching, binding or kinking of the cable. This can be accomplished for example by selection of appropriate materials, thickening the outer member 26, or reinforcing the outer member 26 with fibers, wires and the like.

Figure 4:
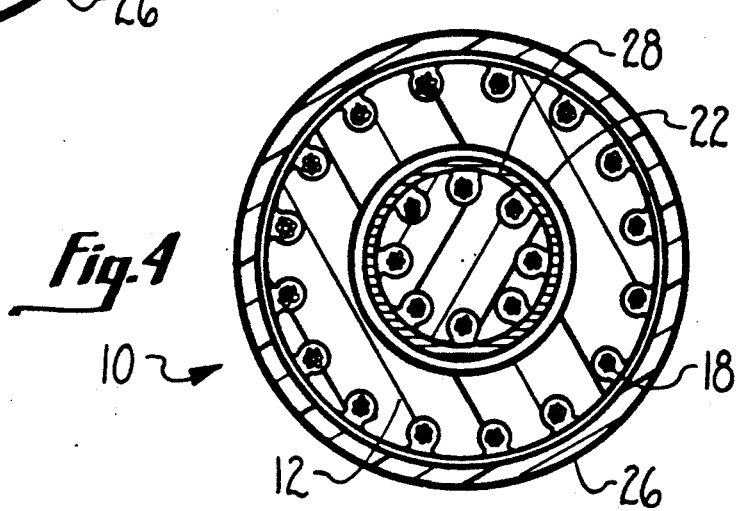
FIG. 4 is a cross-sectional view of the high density fiber optic cable including an external strength member and an additional cable nested in the center of the core member.

Referring now to FIG. 4, another possible embodiment is shown. In this embodiment, outer member 26 again doubles as the strength member of cable 10. An internal void 22 is again provided contains an additional cable 28. While cable 28 is shown as a cable including the features of the present invention, it is to be appreciated that one or more cables of any type could be placed within the internal void 22. In this manner, a coaxial cable including extremely high density optical fibers can be provided.

While the particular high density fiber optic cable as herein shown and disclosed in detail is fully capable of obtaining the objects and providing the advantages herein before stated, it is to be understood that it is merely illustrative of the preferred embodiments of the invention and that no limitations are intended to the details of construction or design herein shown other than as defined in the appended claims.

We claim:

1. A high density fiber optic cable which comprises:
    an elongated core member having an outer surface, said core member defining a longitudinal axis and having a plurality of helical grooves extending along said outer surface of said core member;
    a plurality of optical fibers nested in at least one of said helical grooves; and
    an outer member surrounding said core member and said optical fibers in said grooves, said outer member holding said optical fibers in said groove;
    wherein said core member includes an internal coaxial void; and
    wherein at least one additional high density cable nests in said void, said additional cable comprising an elongated core member having an outer surface, said core member defining a longitudinal axis and having a plurality of helical grooves extending along said outer surface of said core member; a plurality of optical fibers nested in at least one of said helical grooves; and an outer member holding said optical fibers in said grooves.

2. A high density fiber optic cable as recited in claim 1 wherein a strength member nests in said void.

3. A high density fiber optic cable as recited in claim 1 further comprising an exterior strength member internally supporting said core member, said optical fibers, and said outer member.

* * * * *